US008496024B2

(12) United States Patent
Jones

(10) Patent No.: US 8,496,024 B2
(45) Date of Patent: Jul. 30, 2013

(54) PAINT CIRCULATION SYSTEM WITH COILED BACK PRESSURE REGULATOR

(75) Inventor: Michael Jones, Pleasant Ridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2274 days.

(21) Appl. No.: 11/290,662

(22) Filed: Nov. 30, 2005

(65) Prior Publication Data

US 2007/0122555 A1 May 31, 2007

(51) Int. Cl.
*B05D 1/02* (2006.01)
*F16L 55/027* (2006.01)

(52) U.S. Cl.
USPC .......................... 137/565.22; 427/345; 138/42

(58) Field of Classification Search
USPC ............. 137/563; 427/345; 118/300; 138/42, 138/40
See application file for complete search history.

(56) References Cited

U.S. PATENT DOCUMENTS 3,346,117 A 10/1967 Page, Jr.
4,106,525 A 8/1978 Currie et al.
4,506,423 A 3/1985 Nakamura et al.
4,886,086 A 12/1989 Etchells et al.
4,887,639 A 12/1989 Lewis et al.
5,176,176 A 1/1993 Lewis et al.
5,309,403 A * 5/1994 Bartow ......................... 366/136
5,406,982 A 4/1995 Phillips et al.
6,168,824 B1 1/2001 Barlow et al.
6,179,223 B1 1/2001 Sherman et al.
2004/0154532 A1* 8/2004 Ramsay ........................ 118/300
2006/0177565 A1* 8/2006 Bhattacharya et al. ........... 427/8
2007/0075163 A1* 4/2007 Smith et al. ................... 239/124

* cited by examiner

*Primary Examiner* — John K Fristoe, Jr.
*Assistant Examiner* — Atif Chaudry
(74) *Attorney, Agent, or Firm* — Tung & Associates; Raymond L. Coppielle

(57) ABSTRACT

A paint circulation system for use in painting a workpiece. The paint circulation system operates to deliver paint to a paint applicator placed adjacent a workstation such as a paint spray booth. The paint is continuously circulated through the system and is returned to a paint reservoir through a paint return conduit. A coiled tube back pressure regulator located on the paint return conduit between the paint return manifold and paint reservoir functions to achieve a desired pressure drop in the paint circulation system while reducing paint shear and degradation typically associated with conventional pressure regulators.

20 Claims, 3 Drawing Sheets

PAINT CIRCULATION SYSTEM WITH COILED BACK PRESSURE REGULATOR

CROSS-REFERENCE TO RELATED APPLICATIONS

Not Applicable

BACKGROUND OF THE INVENTION

1. Field of the Invention

The present invention relates to a paint circulation system; and, more specifically, to a paint circulation system including a coiled back pressure regulator.

2. Description of Related Art

Modern manufacturing processes, including those used for automotive vehicles, typically utilize a paint circulation system capable of delivering a multitude of paint colors at the same time. Each color requires a separate distribution system including a network of supply and return lines, a plurality of paint applicators, such as spray guns or rotary bells and a circulation pump that operates to continuously circulate the paint within the system. The system also includes a back pressure regulator that operates to control pressure and fluid flow through the circulation system. Manual and automatic paint applicators require controlled fluid pressure and flow to efficiently and repeatedly apply paint to products such as automotive vehicles. Depending upon the type of paint used, current pressure regulation systems can be effective and efficient at controlling fluid pressure and flow. Typically, these regulators operate by changing velocity of the fluid by passing it through an orifice to the size of which is changed by tightening a valve member or gate to close the size of the opening or tightening a member to increase or decrease the size of a bladder and thereby restrict fluid flow. Such regulators, however, produce a large amount of paint shear as the continuous flow of paint is taken from a high pressure to a low pressure in a very short distance.

As color is a very important characteristic to the customer, particularly in the area of automotive vehicles, providing a large range of colors has become very important. One drawback of increasing available colors is that there is a lower percentage of demand on the other colors. Accordingly, reduced color usage correspondingly increases paint residence time in the circulation system. The longer the paint remains circulating in the current systems, the more paint shear occurs. Shear degradation is most apparent in short circulation systems local to the booths that are designed to offer special order or low-volume colors. Back pressure regulators in short systems typically operate under a high pressure drop in order to provide sufficient pressures at the paint applicators. Pigments and mica flakes in metal paints will deform or degrade over time when subjected to shear stress resulting in a less consistent paint appearance and the potential for increased replenishment of paint and scrap paint.

Accordingly, there is a need for a low shear back pressure regulator for use with a paint circulation system that reduces paint shear and corresponding paint degradation thereby resulting in a more uniform paint and less scrap.

SUMMARY OF THE INVENTION

Accordingly, the present invention is an apparatus and method for reducing paint shear in paint circulation systems. The apparatus includes a paint reservoir, a circulation pump and a paint supply conduit delivering paint to a paint supply manifold. A paint return manifold and paint return conduit return paint to the paint reservoir. A back pressure regulator located in the paint return conduit between the paint return manifold and paint reservoir operates to control the system pressure. The back pressure regulator includes a tube having a length sufficient to achieve a predetermined pressure drop while maintaining laminar flow.

According to one aspect of the invention, the tube is coiled to reduce regulator space. Typically, the inner diameter of the tube is used to determine the length or amount of tube needed to achieve the predetermined pressure drop.

The present invention further includes a method for controlling the pressure in a paint circulation system. The method includes providing a patent reservoir and pumping paint from the paint reservoir through a paint supply conduit to a paint supply manifold. Providing a paint return manifold, and collecting unused paint from the paint supply manifold in the paint return manifold. Transporting the paint through a paint return conduit from the paint return manifold to the paint reservoir and controlling the back pressure in the paint return conduit by passing the paint through a tube having a length sufficient to achieve a predetermined pressure drop.

DETAILED DESCRIPTION OF THE PREFERRED EMBODIMENTS

Figure 1:
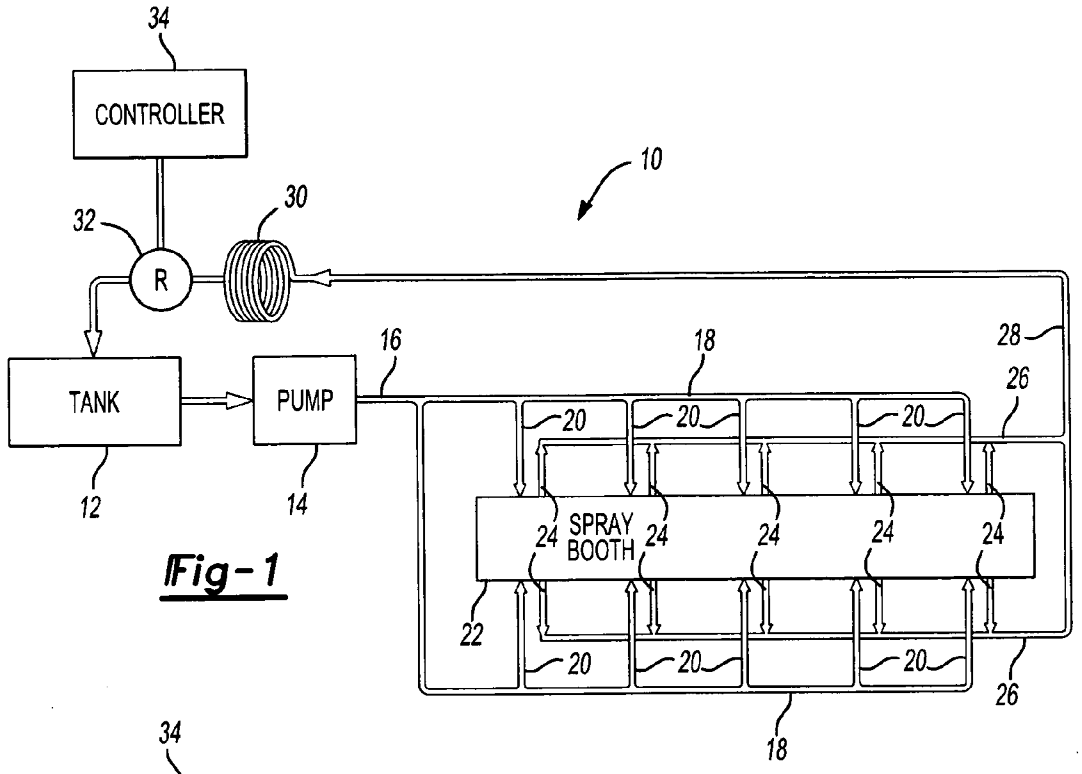
FIG. 1 is a schematic view of a parallel paint circulation system according to the present invention.

Referring now to the drawings, FIG. 1 illustrates a parallel paint circulation system, seen generally at 10, according to the present invention. The paint circulation system 10 typically includes a paint reservoir or tank 12. A pump 14 supplies paint from the reservoir 12 through a paint supply conduit 16 to a paint supply header 18. A plurality of supply drop lines 20 connected to the paint supply header 18 supply paint to a paint station (not shown) having a paint applicator such as a spray gun or rotary bell used to apply paint to a workpiece in the spray booth 22. A plurality of return drop lines 24 connected to the paint station return the unused paint to a paint return header 26. A paint return conduit 28 returns the paint through a first back pressure regulator 30. A second back pressure regulator 32 operated by a controller 34 provides an additional means to control the flow of the paint circulating through the system 10.

Figure 2:
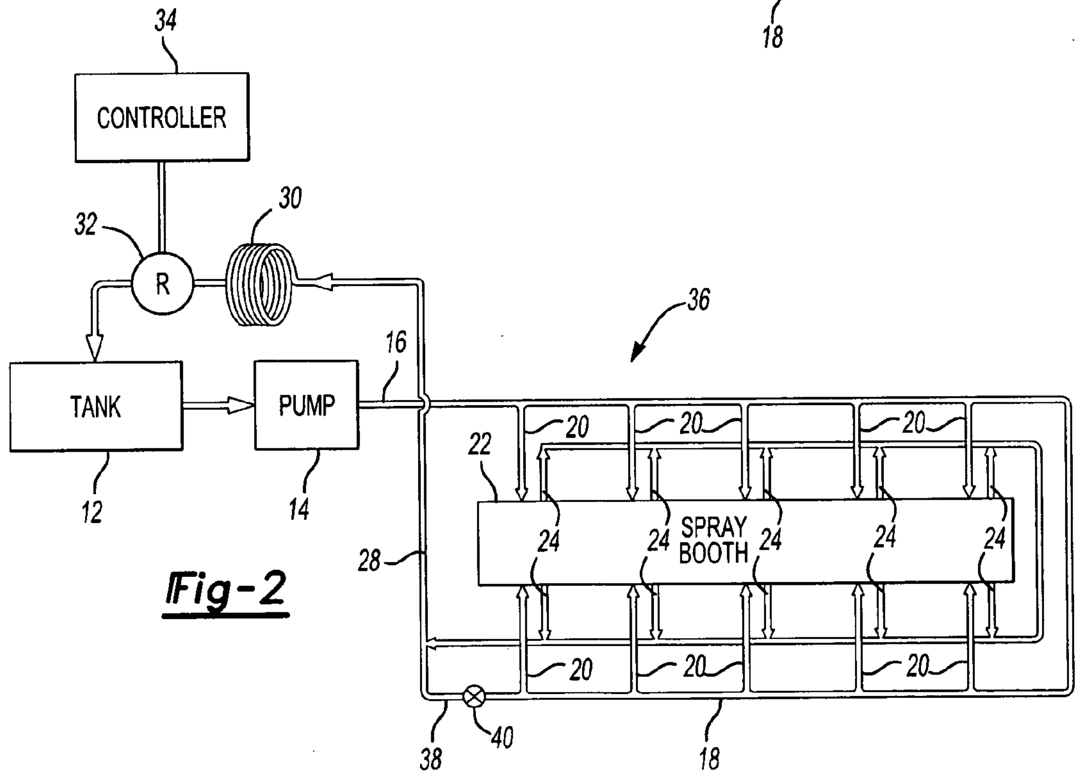
FIG. 2 is a schematic view of a pressure differential paint circulation system according to the present invention.

FIG. 2 illustrates a pressure differential paint circulation system, seen generally at 36. The primary difference between the two systems being a connector conduit 38 having a valve or in-line restrictor 40 disposed between the paint supply header 18 and the paint return conduit 28. The in-line restrictor 40 operates to provide additional control and means to regulate the pressure within the paint circulation system 36.

Figure 3:
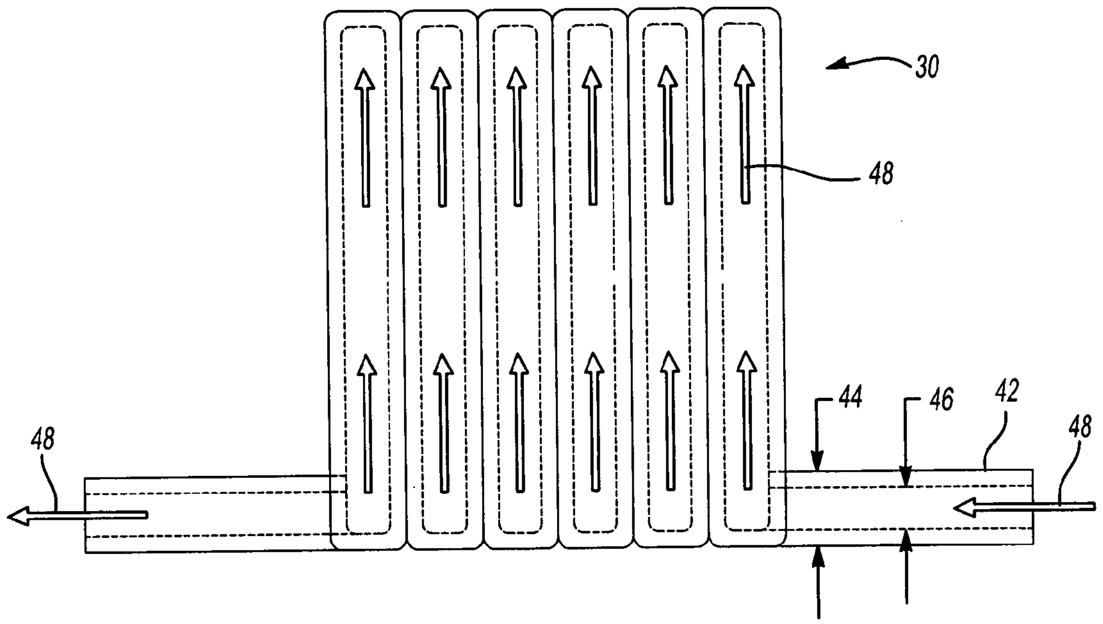
FIG. 3 is a schematic side view of a coiled back pressure regulator according to the present invention.
Figure 4:
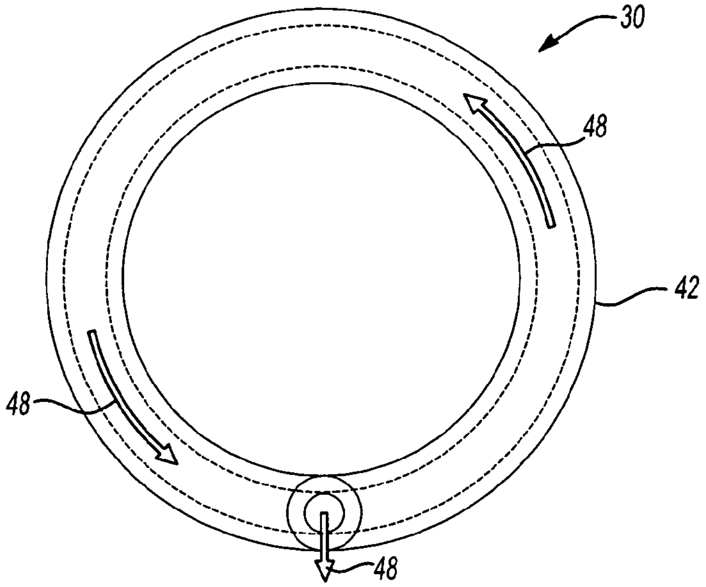
FIG. 4 is a schematic end view of the coiled back pressure regulator of FIG. 3.
Figure 5:
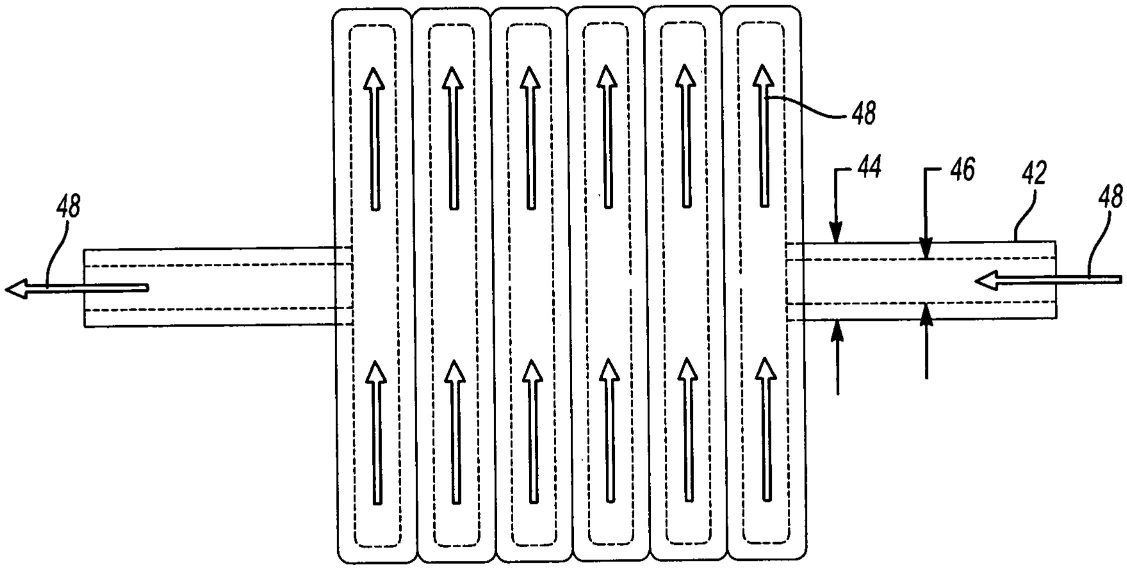
FIG. 5 is a schematic top view of the coiled back pressure regulator of FIG. 3.

Turning now to FIGS. 3-5 the back pressure regulator 30 according to the preferred embodiment is shown in greater detail. The back pressure regulator 30 includes a tube 42 having an outer diameter 44 and an inner diameter 46. Arrows 48 illustrate the flow path of the paint or other fluid through the regulator 30. As the paint flows through the tube 42 a pressure drop occurs. Taking into account the known flow properties of the paint or other fluids traveling through the system and the length and inner diameter 46 of the tube 42, the pressure drop can be determined. Conversely, the length of the tube 42 needed to produce a predetermined pressure drop can also be determined. Accordingly, to reduce the shear rate and corresponding shear degradation of the paint occurring with standard type valve or bladder regulators, the length of the tube 42 used in the back pressure regulator 30 produces laminar flow at a predetermined pressure drop.

As shown, coiling the tube 42 reduces the overall size of the back pressure regulator 30. Further, varying the inner diameter 46 also functions to vary the pressure drop produced by the back pressure regulator 30. Based on the flow properties of the paint, the back pressure regulator 30 produces a predetermined pressure drop over a large distance of fluid flow as opposed to conventional instant pressure drop regulators thereby reducing paint shear and corresponding paint degradation.

An additional or second pressure regulator 32 of the valve, bladder or diaphragm type can also be used in the paint circulation systems 10, 36 to provide for small pressure adjustments. The second pressure regulator 32 can be manual or equipped with a pressure transducer and controller 34 that automatically controls the pressure to a set value. Such pressure adjustments may be required when the paint or fluids used in the paint circulation systems 10, 36 have properties of that differ slightly from those used to determine the parameters; i.e., length and diameter of tube 42 of the back pressure regulator 30 and allows the system to the fine tune. Since the pressure drop over the second regulator 32 is small; i.e., ±10 p.s.i., any paint degradation resulting from paint shear is greatly reduced.

Accordingly, the present invention provides a paint or other fluid circulation system sensitive to shear forces generated by the circulating fluid. By utilizing a tube as a back pressure regulator, the system provides a predetermined pressure drop over a large distance of fluid flow which enables the back pressure regular to operate at any desired shear rate. For example, a coiled tube low shear back pressure regulator as disclosed in the present invention may operate in the laminar flow region, Re<2000 $sec^{-1}$. Further, as discussed a small regulator or other type device may be used for small pressure adjustments downstream from the coiled tube back pressure regulator.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A paint circulation system comprising:
- a paint reservoir;
- a circulation pump;
- a paint supply header;
- a paint supply conduit connecting said circulation pump to said paint supply header;
- a plurality of paint supply drop lines connected to said paint supply header and to a paint station for supplying paint to said paint station;
- a paint return header;
- a plurality of paint return drop lines connected to said paint station and to said paint return header for returning unused paint from said paint station to said paint return header;
- a paint return conduit connected on one end thereof to said paint return header and on an opposite end thereof to said paint reservoir; and
- a coiled tube back pressure regulator located on said paint return conduit between said paint return header and said paint reservoir, said coiled tube having an overall tube length sufficient to achieve a desired pressure drop in the paint circulation system while maintaining laminar flow.

2. A paint circulation system as set forth in claim 1 wherein said coiled tube back pressure regulator has an inner diameter equal to an inner diameter of said paint return conduit.

3. A paint circulation system as set forth in claim 1 wherein said coiled tube back pressure regulator has an inner diameter that varies with respect to an inner diameter of said paint return conduit.

4. A paint circulation system as set forth in claim 1 wherein said coiled tube back pressure regulator includes a coiled portion of said paint return conduit.

5. A paint circulation system as set forth in claim 1 including a second regulator placed on said paint return conduit.

6. A paint circulation system as set forth in claim 5 including said second regulator placed on said paint return conduit downstream of said coiled tube back pressure regulator.

7. A paint circulation system as set forth in claim 5 including a controller connected to said second regulator, said controller operative to control said second regulator to provide additional pressure adjustments.

8. A paint circulation system comprising:
- a circulation pump;
- a paint reservoir;
- a paint supply header;
- a paint supply conduit connecting said circulation pump to said paint supply header;
- a plurality of paint supply drop lines connected to said paint supply header and to a paint station for supplying paint to said paint station;
- a paint return header;
- a plurality of paint return drop lines connected to said paint station and to said paint return header for returning unused paint from said paint station to said paint return header;
- a paint return conduit connected on one end thereof to said paint return header and on an opposite and thereof to said paint reservoir, said paint return conduit operative to return unused paint from said paint return header to said paint reservoir; and
- said paint return conduit including a coiled portion having at least one coil, said coiled portion located between said paint return header and said paint reservoir, wherein said coiled portion operates to achieve a desired pressure drop.

9. A paint circulation system as set forth in claim 8 including a plurality of coils formed by said paint return conduit, the length of said paint return conduit forming said coils determined based on an inner diameter of said paint return conduit, known fluid flow properties of the paint and said desired pressure drop.

10. A paint circulation system as set forth in claim 8 including a plurality of coils formed by said paint return conduit, the length of said paint return conduit forming said coils calculated to achieve laminar flow at said predetermined pressure drop.

11. A paint circulation system as set forth in claim 8 including a second regulator placed on said paint return conduit.

12. A paint circulation system as set forth in claim 11 including said second regulator placed on said paint return conduit downstream of said coiled tube back pressure regulator.

13. A paint circulation system as set forth in claim 11 including a controller connected to said second regulator, said controller operative to control said second regulator to provide additional pressure adjustments.

14. A method for controlling the pressure in a paint circulation system comprising the steps of:

providing a paint reservoir;

pumping paint from the paint reservoir through a paint supply conduit to a paint supply header;

providing a plurality of paint supply drop lines connected to the paint supply header and supplying paint through the paint supply drop lines to a paint station;

providing a paint return header and a plurality of paint return drop lines connected to the paint station and to the paint return header, collecting unused paint from the paint station through the paint return drop lines in the paint return header and transporting said unused paint back to the paint return reservoir from the paint return header through a paint return conduit connected to the paint return header and to the paint return reservoir; and controlling the back pressure in the paint circulation system by passing the paint through a coiled portion of the paint return conduit to achieve a predetermined pressure drop.

15. A method for controlling the pressure in a paint circulation system as set forth in claim 14 wherein the step of passing the paint through a coiled portion of the paint return conduit to achieve a predetermined pressure drop includes maintaining laminar flow of the paint passing through the coiled portion of the paint return conduit.

16. A method for controlling the pressure in a paint circulation system as set forth in claim 15 when the step of maintaining laminar flow of the paint passing through the coiled portion of the paint return conduit includes varying an inside diameter of the paint return conduit as necessary to achieve both laminar flow and the predetermined pressure drop.

17. A method for controlling the pressure in a paint circulation system as set forth in claim 15 including providing a second pressure regulator on the paint return conduit; and using the second pressure regulator to provide additional adjustments to the back pressure in the paint circulation system to maintain the predetermined pressure drop.

18. A method for controlling the pressure in a paint circulation system as set forth in claim 14 including providing a second pressure regulator downstream of the coiled portion of the paint return conduit; and using the second pressure regulator to provide additional adjustments to the back pressure in the paint circulation system to maintain the predetermined pressure drop.

19. A method for controlling the pressure in a paint circulation system as set forth in claim 14 including providing a second pressure regulator on the paint return conduit; and using the second pressure regulator to provide additional adjustments to the back pressure in the paint circulation system to maintain the predetermined pressure drop.

20. A method for controlling the pressure in a paint circulation system as set forth in claim 19 including using the controller to control the second pressure regulator and automatically control pressure to a set value.

* * * * *